United States Patent Office 3,239,513
Patented Mar. 8, 1966

3,239,513
TRIAZINYLSTILBENE OPTICAL BRIGHTENING AGENTS
Heinrich Hausermann, Riehen, near Basel, Switzerland, assignor to J. R. Geigy A.G., Basel, Switzerland
No Drawing. Filed Dec. 18, 1964, Ser. No. 419,571
Claims priority, application Switzerland, Nov. 20, 1959, 80,847/59
4 Claims. (Cl. 260—240)

This application is a continuation-in-part of my co-pending application Serial No. 70,124 filed Nov. 18, 1960.

The invention concerns liquid, concentrated brightening preparations, processes for the production thereof and for the production of active substances suitable therefor, their use, particularly in the paper industry, and the materials, in particular the fine papers, the appearance of which is improved with their aid.

Liquid brightening preparations having a high content of active ingredient are desired by industry because they are simple to use and more easily incorporated into textile or paper treatment liquors. This is the case principally in the paper industry, particularly the fine paper industry, e.g. for the production of sized and filled papers and of coated fine papers the appearance of which is to be improved by means of blue-fluorescent brightening agents.

Nowadays, agents, the blue fluorescence of which is more of a violet shade (which appears usually pinkish to the observer) are preferred to those of a blue fluorescence of greenish shade.

A primary requirement of such industrial liquors containing active brightening ingredients is a high degree of stability even during long storage.

Moreover, not every brightening ingredient which can be converted into a concentrated, stable liquid form fulfills other requirements made in the paper industry. As organic solubility promoters are necessary for the production of liquid forms of active ingredient which, as a rule, reduce the affinity to the material to be brightened, the blue-fluorescent active ingredients employed in the manufacture of fine papers must have a high affinity for at least one component of this material. A good affinity to the barium sulfate type and other white pigments is important for filled fine papers and, particularly, for coated fine papers.

The present invention is concerned primarily with active substances which are not only suitable for use in the preparation in concentrated liquid form and are stable in the same even during long storage times, but which also have good affinity to the aluminum sulfate or barium sulfate type additives and other white pigments conventionally used in the fine papers.

The active compounds of such brightening preparations according to the invention correspond to the formula

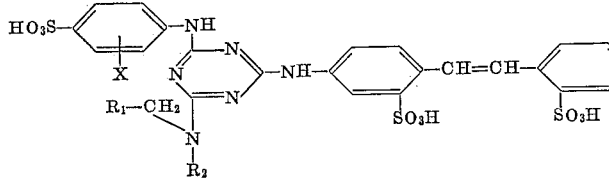

In this formula

X represents advantageously hydrogen, or the methyl group,
$R_1$ represents a lower alkyl of from 2 to 4 carbon atoms containing from two to three hydroxyl groups, one of which is advantageously in $\beta$-position to the respective amino nitrogen atom, not more than one hydroxyl group being linked to each carbon atom of $R_1$,
$R_2$ represents lower alkyl, advantageously the methyl group.

Particularly valuable brightening agents correspond to the formula

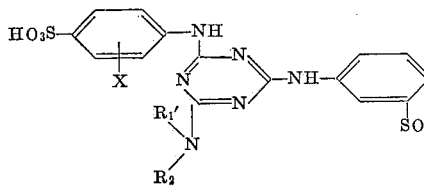 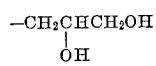 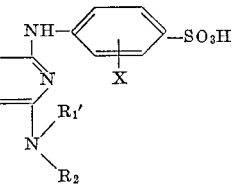

wherein
X represents a member selected from the group consisting of H and —$CH_3$,
$R_1'$ represents $$-CH_2CHCH_2OH$$
$$\phantom{-CH_2C}|$$
$$\phantom{-CH_2CH}OH$$

and
$R_2$ represents lower alkyl.

Of the compounds of Formula II, those are preferred in which X is hydrogen and $R_2$ is an alkyl radical containing at most 4 carbon atoms.

The active ingredients according to the invention, particularly those prepared with preferred components, have a clear to good affinity to the additives in fine papers, in particular to silicate fillers such as china clay, talcum or kaolin, to calcium sulfate fillers such as the so-called satin white, to calcium carbonate and Blancofix (barium sulfate) as well as to the binding agents usual in paper coating masses such as degraded starches, carboxymethyl celluloses and certain synthetic resin dispersions.

A particular advantage of the compounds according to the invention resides in the fact that their brightening activity does not suffer even in solutions with a relatively high content of alum and the like aluminum salts, as it occurs in the strong backwater (white water) of paper mills.

Hitherto known brighteners when introduced into such backwater, are usually precipitated in the form of their yellowish aluminum salt, and the result is an undesirable discoloration of the paper obtained from pulps processed with such backwater.

Concentrated aqueous solutions of the compounds according to the invention, as they are used in industrial application for brightening purposes, are stable for a much longer time even in the presence of salts than are concentrated solutions of known compounds pertaining to the class of s-triazinyl-substituted stilbenes.

More in particular, the compounds according to the invention can be incorporated into liquid preparations in

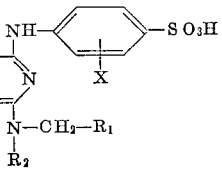

high concentrations, of 25% and higher, e.g. brightener stock solutions for industrial purposes, especially in the paper and textile industries, even when they still contain 10% or more of sodium chloride, due to the above described process of making them; such products consisting essentially of the brightening compounds defined above and 10% or more of sodium chloride are readily soluble in such industrial liquids and form no precipitates even when stored for long periods of time, of at least three to six months, or longer (percentages are by weight).

The content of inorganic salt of the sodium chloride type in the liquid brightening preparations according to the invention is maximally, calculated for the case of sodium chloride, about 10 to 100% of the weight of the optical brightening agent, depending on the desired concentration of the latter in the preparation.

Known stilbene brighteners such as those described in U.S. Patent 3,012,971 to Gessner et al require careful elimination of the salt content to a permissible amount of less than 5%, if industrial liquids with the abovementioned concentrations of brighteners are to be prepared. Otherwise, at sodium chloride contents of 5% and higher, precipitation of the brightener takes place, which may lead to spotty effects on the treated materials.

Concentrated, liquid forms of known brightening agents as well as those according to the invention and the active ingredients suitable therefor are obtained by—

(1) reacting in an aqueous medium in any order desired, soluble salts of 1 mol of 4,4'-diaminostilbene-2,2'-disulfonic acid and of 2 mols of an aminobenzene, with 2 mols of cyanuric halide and (2) in the resulting condensation product dispersed in the reaction medium, reacting the remaining halogens with a lower molecular secondary alkanolamine, isolating the resulting product to separate the same as much as possible from ionogenic salt (NaCl) and other byproducts of the reaction, and (3) subsequently admixing the product with water as well as certain organic solubility promoters which are easily soluble in water, and then, if necessary, filtering off solid precipitates from the concentrated solution of active ingredient.

Conventionally, the production of concentrated liquid preparations requires concentrated aqueous solutions of the active ingredient which can only be produced in the absence of larger amounts of inorganic salts, especially sodium chloride. In the known methods of preparations, the inorganic salts must be removed, for example, by dialysis and the dilute solutions of the active ingredients are then concentrated by evaporating or steaming off the water.

Or, in lieu of using dialysis, the reaction product is isolated in the form of its free acid which can be washed with water to remove all electrolytes present therein. The free acid must then be converted to an alkali metal or an ammonium salt which is then used for preparation of stable, relatively concentrated solutions.

By adding organic solvents to the concentrated aqueous preparations of the end products so obtained, concentrated solutions of the active brightening ingredients are obtained, sometimes with further separation of precipitates formed, which solutions must be further clarified by filtering off such precipitates.

The concentrated, liquid brightening preparations according to the invention and the active ingredients suitable therefor are obtained in the manner described hereinbefore, but with the following improvements:

(a) A soluble salt of 1 mol of 4,4'-diamino-stilbene-2,2'-disulfonic acid is reacted with 2 mols of a 4-aminophenyl sulfonic acid, the phenyl radical of which can be further substituted by a methyl group, and with 2 mols of cyanuric halide;

(b) The resulting intermediate condensation product is preferably isolated, e.g. by adding to the reaction medium inorganic salt (preferably NaCl) in amounts of about 5 to 10% by weight calculated on the weight of the reaction medium, and again dispersed in water;

(c) The reaction of the remaining halogens is carried out with simultaneous or subsequent admixture of organic solubility promoters which are easily soluble in water, with a lower molecular secondary alkanolamine which contains an alkyl radical as nitrogen substituent;

(d) If no isolation of the intermediate condensation product has been effected, the final product is isolated by saturation of the reaction medium with inorganic salt (NaCl), about 30% being usually required, calculated on the weight of the final product.

Preferred brightening preparations and active ingredients suitable therefor according to the invention are obtained by using 4-aminobenzene-1-sulfonic acid.

More in detail, the reaction of 2 mols of an alkali metal salt of p-aminobenzene sulfonic acid is carried out in the cold with 2 mols of finely distributed cyanuric halide, in particular cyanuric chloride, at a pH of at most 7, and liberated acid is neutralized, for example, with dilute alkali carbonate or alkali bicarbonate solution, until the primary amino groups have disappeared. Then the two mols of the alkali metal salt of 4-(4,6-dihalogen-1,3,5-triazinyl-(2)-amino)-benzene-1-sulfonic acids are reacted at temperatures of from 15° to 60° C. with the solution of 1 mol of an alkali metal salt of 4,4'-diaminostilbene-2,2'-disulfonic acid until the free amino groups have disappeared, liberated acid being neutralized. Finally, the solution of the alkali metal salt of 4,4'-bis-[4 - (4'-sulfophenylamino)-6-halogen-1,3,5-triazinyl-(2)-amino]-stilbene-2,2'-disulfonic acid obtained is reacted at elevated temperature (70 to 90° C.) with an excess of the secondary alkanolamine until the halogens bound at the triazine ring have all been replaced. This last reaction can be performed in the presence of an acid-binding nitrogen base.

The reaction can be performed under otherwise comparable conditions in reversed order by first reacting the solution of the alkali metal salt of 1 mol of 4,4'-diaminostilbene-2,2'-disulfonic acid with 2 mols of a cyanuric halide, advantageously cyanuric chloride or, also, cyanuric bromide, until the primary amino groups have disappeared, then reacting the condensation product with the solution of the alkali metal salt of 2 mols of a 4-aminobenzene-1-sulfonic acid and, finally, with an excess of the above defined alkanolamine.

The moist intermediate condensation products in step (c), or the moist final products obtained in step (d), if precipitated as free acids in mineral acid solution, can be reacted with excess alkanolamine, in the presence of tertiary nitrogen base, whereby ammonium salts of the end product with these nitrogen bases are obtained.

These ammonium salts can also be used as active ingredients in the preparations according to the invention.

In the above-described reaction, the necessary amount of solubility promoter depends to a great extent on its properties, but is considerably lower (e.g. less than half) than the amount of solubility promoters required in the known liquid high concentrate brightening preparations. Such promoters are preferably liquid substances which are easily miscible with water; amounts of about 25 to 100% calculated on the weight of the solid active ingredient according to the invention are sufficient for the preparation of aqueous solutions having a content of active ingredient of 25–40%.

As organic solubility promoters which are easily soluble in water, are used, for example: water miscible polyvalent alcohols such as ethylene glycol, propylene glycol, butylene glycol, glycerin, pentaerythritol, sugar, sulfite cellulose waste liquor; water miscible ether or thioether alcohols such as e.g., ethylene-glycol monomethyl, monoethyl, monopropyl or monobutyl ethers, di-β-hydroxyethyl, di-β-hydroxyethylthioether, ethylene glycol di-β-hydroxyethyl ether, diethylene glycol monomethyl or monoethyl ether, various not too high molecular polyglycol ethers; easily water soluble amides of carbonic acid or of carboxylic acids such as e.g., urea, N-dimethyl-methyl-, -ethyl-, methoxyethyl- or ethoxyethyl-urethane, formamide, N-dimethyl-formamide, acetamide, N-diethyl acetamide, N-diethyl acetamide, N-dimethyl- or N-diethyl-benzamide, acetic acid diethanolamide, benzoic acid diethanolamide; alkanolamines such as monoethanolamine, diethanolamine, triethanolamine, N-methyl- or N-ethyl-mono- or -diethanolamines, propanolamines Instead of one of these compounds, it is often advantageous to use mixtures thereof. Ethylene glycol monomethyl and monoethyl ethers are preferred organic solubility promoters in the preparation of concentrated, liquid forms of brightening agents according to the invention.

Further details regarding the production and use of the active ingredients and liquid forms of brightening agents according to the invention can be seen from the following examples, which illustrate the invention without limiting it. Where not otherwise stated, parts and percentages are given by weight. The temperatures are in degrees centigrated. The relationship of parts by weight to parts by volume is as that of grams to cubic centimeters.

*Example 1* by the successive addition of 26.5 parts of sodium carbonate. When no more free sulphanilic acid can be traced, 150 parts of sodium chloride are added to the suspension obtained, the white product is filtered off, washed with 5% sodium chloride solution and acetone and dried in vacuo at 35–45°.

The preparation obtained can be used in the usual way for the whitening of cellulose substrata. Compared with products in pulverulent form, this liquid preparation has the advantage of being more conveniently measured and of being much more quickly distributed homogenously in the dye liquor. When used in the paper industry, the preparation has the advantage of a good affinity to the fillers used in paper finishing such as e.g. kaolin, china clay (aluminum silicate), talcum and calcium sulfate. In the production of fine papers such as, e.g. chromo papers, considerably more brightened results are obtained on using the brightening preparation described than when the usual paper brighteners are used.

If in this example, the 200 parts of N-ethyl-1-aminopropane-2,3-diol are replaced by 250 parts of N-butyl-1-amino-propane-2,3-diol, then the tetrasodium salt of 4,4'-bis-[2''-N-butyl-β,γ-dihydroxy-propylamino-4'' - (p - sul-

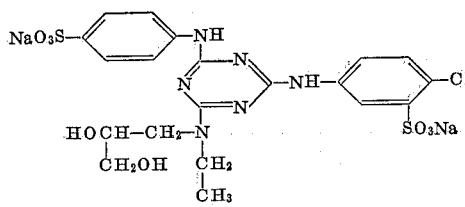 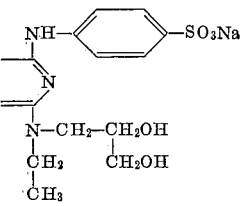

148 parts of 4,4'-diaminostilbene-2,2'-disulphonic acid are dissolved with 32 parts of sodium hydroxide in 2000 parts of water. 290 parts of the sodium salt of 1-[2',4'-dichloro-1',3',5'-triazinyl-(6')-amino] - benzene-4-sulphonic acid are added while stirring at 40–50° within 1 hour and the acid liberated is neutralised by successive additions of a solution of 43 parts of sodium carbonate in 250 parts of water. The whole is then stirred at 50–60° until after about 3 hours, no more free, primary, aromatically bound amino groups can be traced. 200 parts of N-ethyl-1-aminopropane-2,3-diol are then added to the white suspension obtained which consists of the tetrasodium salt of 4,4'-bis-[2''-chloro-4''-(p-sulphophenylamino) - 1'',3'', 5''-triazinyl - (6'')-amino]-stilbene-2,2'-disulphonic acid, and the whole is heated for 90 minutes at 85–90° while stirring. In this way, a yellowish to pale brown coloured, clear solution is obtained which contains the desired triazinyl derivative of the formula given above.

To convert it into a liquid preparation containing 37% of active substance, the solution is concentrated under reduced pressure to 1000 parts and then converted into a relatively thinly liquid solution by heating with 240 parts of ethylene glycol monomethyl ether. Precipitated sodium chloride is filtered off at 40° and the clear filtrate is made up to a weight of 1300 parts with water.

The sodium salt of 1-[2'-4'-dichloro-1',3',5'-triazinyl-(6')-amino]-benzene-4-sulphonic acid mentioned above is produced as follows: 93 parts of cyanuric chloride are dissolved in 400 parts by volume of acetone and the solution is poured while stirring into 1000 parts of ice water. A solution of 97.5 parts of the sodium salt of sulphanilic acid in 500 parts of water is poured within 30 minutes at 0° while stirring well into the fine cyanuric chloride suspension so obtained and the acid liberated is neutralised fophenylamino)-1'',3'',5'' - triazinyl-(6'') - amino]-stilbene-2,2'-disulfonic acid is obtained in an analogous manner. As a brightening agent it is an equally active, stable, liquid preparation.

*Example 2*

37 parts of cyanuric chloride are dissolved in 200 parts of acetone and the solution is poured while stirring into a mixture of 400 parts of crushed ice and 400 parts of water. A solution of 37 parts of 4,4'-diaminostilbene-2,2'-disulfonic acid in 500 parts of 1.6% caustic soda lye is poured within 30 minutes while stirring into the cyanuric chloride suspension obtained. The acid liberated is neutralized by the successive addition of 16.8 parts of sodium bicarbonate. As soon as no more free 4,4'-diaminostilbene-2,2'-disulfonic acid can be traced, 39 parts of the sodium salt of sulfanilic acid are added and the mixture is heated at 45–55° while keeping the reaction neutral with 15% aqueous sodium carbonate solution until a sample tested by diazotisation shows that no more free sulfanilic acid is present. In this way, a suspension of the tetrasodium salt of 4,4'-bis-[2''-chloro-4'' - (p - sulfophenylamino)-1'',3'', 5''-triazinyl-(6'')-amino]-stilbene-2,2'-disulfonic acid is obtained.

This intermediate product is converted into an easily filtrable form by salting out with sodium chloride added in an amount of 10% by volume calculated on the total volume of the reaction mixture, the precipitate is filtered off under suction and dried in vacuo at 70°. The active content is ascertained by analysis of the organically bound chlorine (total chlorine less ionogenic chlorine).

An amount of the resulting dry crude, easily filtrable intermediate product which contains 20.5 parts of the compound of the formula

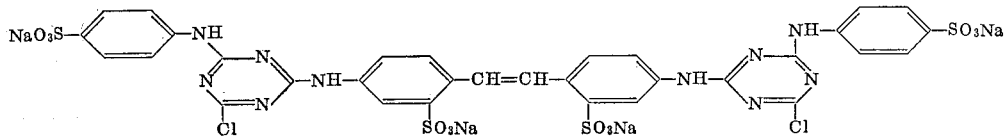

is added to a solution of 11.9 parts of N-ethyl-1-amino-propane-2,3-diol in 25 parts of water and 15 parts of ethylene glycol monoethyl ether and the whole is heated for 4 hours at 80–90°. A clear, stable preparation is obtained which contains the brightening agent described in Example 1 as active component.

Liquid preparations having an equally good action are obtained if the N-ethyl-1-amino-propane-2,3-diol is replaced by equivalent amounts of the following bases:

N - methyl-1-amino-propane-2,3-diol N - ethyl-tris(hydroxymethyl) - aminomethane (prepared from Tris - (hydroxymethyl)-aminomethane and ethyl bromide) and N-butyl-1-aminopropane-2,3-diol.

*Example 3*

Similarly active brightening preparations are obtained if in this example, the 37.4 parts of 3-methyl-1-aminobenzene-4-sulfonic acid are replaced by 37.4 parts of 2-methyl-1-aminobenzene-4-sulfonic acid.

*Example 4*

The procedure described in Example 1 is followed but the tetrasodium salt of 4,4'-bis[2"(-N-ethyl-β,γ-dihydroxypropylamino) - 4"-(p-sulfophenylamino)-1"',3"',5"'-triazinyl-(6")-amino]-stilbene-2,2'-disulfonic acid obtained is separated in a solid form by saturating with sodium chloride. It is dried in vacuo at 80°.

In this way, the brightening agent is obtained as a very easily water soluble, pale yellow powder. To produce

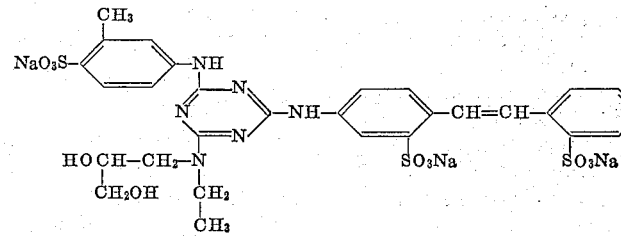 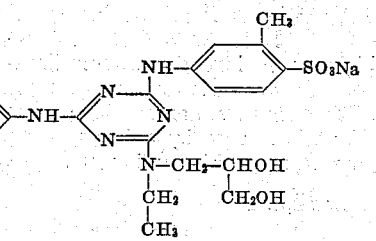

37 parts of cyanuric chloride are dissolved in 200 parts by volume of acetone and the solution is suspended in a mixture of 500 parts of ice and 400 parts of water. The solution of 37.4 parts of 3-methyl-1-aminobenzene-4-sulphonic acid and 8 parts of sodium hydroxide in 300 parts of water is poured into the cyanuric chloride suspension so obtained while stirring and the acid liberated is neutralised by the successive addition of 10.6 parts of sodium carbonate. The almost white suspension is stirred at 0° until a diazotised sample shows that there is no more primary, aromatic amine present. 70 parts of sodium chloride are then added and the precipitated sodium salt of 2,4-dichloro-6-(3'-methyl-4'-sulphophenylamino)-1,3,5-triazine is isolated by filtering off under suction. The product can be dried at room temperature in vacuo over sodium hydroxide or dehydrated calcium chloride, or it can be worked up direct in a moist condition.

37 parts of 4,4'-diaminostilbene-2,2'-disulphonic acid and 8 parts of sodium hydroxide are dissolved in 500 parts of water at 30–40°. At this temperature, 72 parts of the sodium salt of 2,4-dichloro-6-(3'-methyl-4'-sulphophenylamino)-1,3,5-triazine described above are added and the mixture is kept at a pH of 6–7 by the dropwise addition of 15% aqueous sodium carbonate solution until no more 4,4'-diaminostilbene-2,2'-disulphonic acid can be traced. After adding 50 parts of sodium chloride, the pale grey suspension is quickly heated to 80°, then cooled to 30° and the tetrasodium salt of 4,4'-bis-[2"-chloro-4"-(m - methyl-p-sulphophenylamino) - 1"',3"',5"'-triazinyl-(6")-amino]-stilbene-2,2'-disulphonic acid obtained is filtered off. The product is dried in vacuo at 70°. 105.5 parts of the dried intermediate product are added to a mixture of 90 parts of ethylene glycol monoethyl ether, 28.6 parts of N-ethyl-amino-propane-2,3-diol, 33 parts of triethanolamine and 140 parts of water and the whole is heated for 2 hours at 80–90°. A stable, pale brown solution is obtained which contains the product of the formula given above as active substance.

If in this example, the 90 parts of ethylene glycol monoethyl ether used as solubility promoter are replaced by the same amount of the following glycol derivatives: ethylene glycol derivatives: ethylene glycol monomethyl ether, diethylene glycol, ethylene glycol-di-β-hydroxyethyl ether, diethylene glycol monomethyl ether, diethylene glycol monoethyl ether, then stable, liquid brightening preparations containing about 30% of active substance are also obtained.

liquid preparations containing 30% of active ingredient, the substances listed in the following Table in the given ratios can be used:

| Brightening agent, parts | Water, parts | Solubility promoter |
|---|---|---|
| 30 | 50 | 20 parts urea. |
| 30 | 60 | 10 parts dimethyl formamide. |
| 30 | 50 | 20 parts diethylformamide. |
| 30 | 55 | 15 parts diethylacetamide. |
| 30 | 60 | 10 parts dimethylbenzamide. |
| 30 | 50 | 20 parts diethanolamine. |
| 30 | 50 | 20 parts triethanolamine. |
| 30 | 55 | 15 parts monoethanolamine. |
| 30 | 60 | 10 parts sodium salt of m-xylene sulphonic acid. |
| 30 | 50 | 20 parts cane sugar. |
| 30 | 60 | 10 parts pentaerythritol. |
| 30 | 50 | 5 parts sulphite waste liquor+15 parts formamide. |
| 30 | 50 | 20 parts glycerol. |
| 30 | 50 | 20 parts propylene glycol-1,2. |
| 30 | 50 | 20 parts ethylene glycol monopropyl ether. |
| 30 | 50 | 10 parts ethylene glycol monomethyl ether+10 parts ethylene glycol monobutyl ether. |
| 30 | 50 | 20 parts di-β-hydroxyethyl-thioether. |
| 30 | 50 | 10 parts urea+10 parts N-dimethylethylurethane. |
| 30 | 50 | 20 parts N-dimethylmethoxyethylurethane. |
| 30 | 50 | 20 parts acetamide. |
| 30 | 50 | 20 parts acetic acid diethanolamide. |
| 30 | 50 | 20 parts benzoic acid diethanolamide. |

Preparations with a higher content of active substance can be produced in an analogous manner. Thus, starting from the brightener mentioned above, the following combinations with 37.5% or even 40% content of active substance can be produced:

| Brightening agent, parts | Water, parts | Solubility promoter |
|---|---|---|
| 37.5 | 52.5 | 10 parts dimethylformamide. |
| 40 | 45 | 15 parts dimethylformamide. |
| 40 | 45 | 15 parts monoethanolamine. |
| 37.5 | 42.5 | 20 parts ethylene glycol. |
| 37.5 | 42.5 | 20 parts 1,4-butane diol. |
| 37.5 | 42.5 | 20 parts polyethylene glycol of molecular weight 400. |

Example 5

Potassium chloride is employed to salt out the potassium salt from the aqueous solution of the tetrasodium salt of 4,4'-bis-[2''-(N-ethyl-β,γ-dihydroxypropylamino)-4''-(p-sulfophenylamino)-1'',3'',5''-triazinyl-(6'')-amino]-stilbene-2,2'-disulfonic acid produced according to Example 1. The isolated potassium salt is dried and converted into a stable, liquid preparation by heating with ethylene glycol monoethyl ether and water in a ratio of 3:2:5. In this case too, the solvent employed can be replaced by other hydrotropic substances such as, e.g. dimethyl formamide or diethanolamine.

Example 6

Dyeing in the paper mass of papers filled with white pigment:

An aqueous slurry containing 85 parts of cellulose, 15 parts of an aluminum silicate white pigment of the trade name "China Clay" and 0.15 parts of a liquid brightening preparation obtained according to Example 1, is worked up in the usual way with 2 parts of rosin size and 4 parts of aluminum sulfate into a paper sheet. A filled paper of very white appearance is obtained in this manner.

Example 7

Surface coating of a chromo paper.

The following coating mass can be used, for example, to produce a chromo paper:

20 parts of china clay (aluminium silicate white pigment)
20 parts of satin white (calcium sulphate white pigment)
2 parts of a synthetic resin dispersion of the trade name Acronal D 500 produced by Farbenfabriken Bayer, in Leverkusen, Western Germany,
2 parts of casein,
56 parts of water,
0.1 part of the brightening agent as obtained according to Example 2.

A considerably whiter paper is obtained with this coating mass than with the same coating mass which, however, contains a known marketed paper brightening agent.

Example 8

Surface coating of a cutwork printing paper.

Paper intended to carry illustrations is coated in the usual manner with the following coating mass:

50 parts of china clay (aluminum silicate white pigment)
10 parts of degraded starch as binding agent
40 parts of water
0.1 part of a brightening agent obtained according to Example 1.

A paper having an excellent white effect is obtained in this way.

I claim:

1. A member selected from the group consisting of a compound of the formula

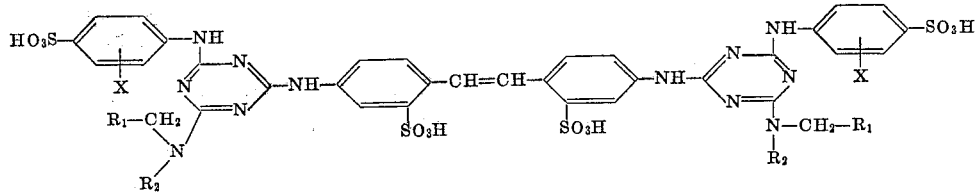

and the alkali metal and ammonium salts thereof; wherein
X represents a member selected from the group consisting of hydrogen and methyl,
$R_1$ represents lower alkyl of from two to four carbon atoms containing from two to three free hydroxyl groups, not more than one hydroxyl group being linked to each carbon atom of $R_1$,
$R_2$ represents lower alkyl.

2. A member selected from the group consisting of a compound of the formula

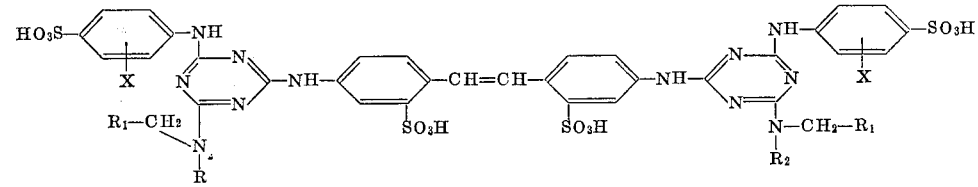

and the alkali metal and ammonium salts thereof; wherein
X represents a member selected from the group consisting of hydrogen and methyl,
$R_1$ represents lower alkyl of from two to four carbon atoms containing from two to three free hydroxyl groups, one of which is in β-position to the respective amino nitrogen atom, not more than one hydroxyl group being linked to each carbon atom of $R_1$,
$R_2$ represents lower alkyl.

3. A member selected from the group consisting of a compound of the formula

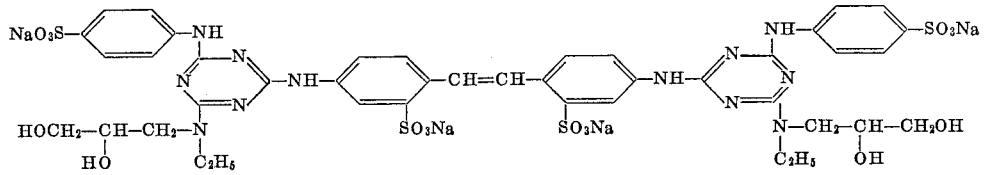

and the alkali metal and ammonium salts thereof.

4. A member selected from the group consisting of a compound of the formula

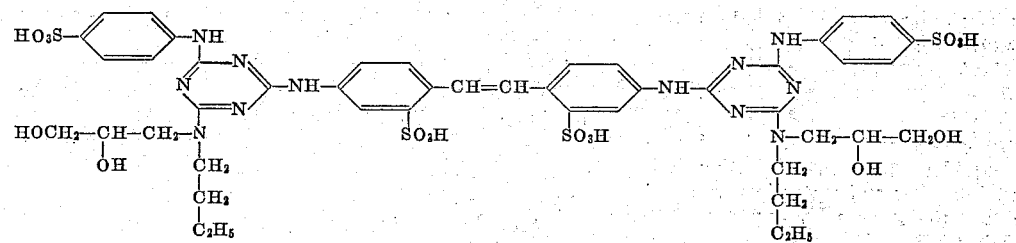

and the alkali metal and ammonium salts thereof.

References Cited by the Examiner

FOREIGN PATENTS 208,955 7/1957 Australia.
1,274,846 9/1961 France.

OTHER REFERENCES

Hausermann et al.: Textil-Rundschau, vol. 16, pages 176–180 (1961).

Theidel: Melliand Textilberichte, part 5, pages 514 to 519 (1964).

WALTER A. MODANCE, *Primary Examiner.*
JOHN D. RANDOLPH, *Examiner.*